United States Patent
Zhang

(10) Patent No.: US 8,861,134 B1
(45) Date of Patent: Oct. 14, 2014

(54) METHOD AND SYSTEM FOR PROVIDING PERPENDICULAR MAGNETIC RECORDING TRANSDUCERS UTILIZING A DAMASCENE APPROACH

(71) Applicant: Western Digital (Fremont), LLC, Fremont, CA (US)

(72) Inventor: Lei Larry Zhang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/905,773

(22) Filed: May 30, 2013

Related U.S. Application Data

(62) Division of application No. 13/412,860, filed on Mar. 6, 2012, now Pat. No. 8,468,682, which is a division of application No. 11/450,607, filed on Jun. 9, 2006, now Pat. No. 8,141,235.

(51) Int. Cl.
  *G11B 5/127* (2006.01)
  *G11B 5/187* (2006.01)

(52) U.S. Cl.
  CPC ............................... *G11B 5/1878* (2013.01)
  USPC ................................................... 360/125.09

(58) Field of Classification Search
  CPC ... G11B 5/1278; G11B 5/3163; G11B 5/3116
  USPC .............. 360/122, 125.03, 125.09, 125.1, 360/125.13; 29/603.13
  See application file for complete search history.

(56) References Cited

U.S. PATENT DOCUMENTS

| | | | |
|---|---|---|---|
| 4,274,022 A | 6/1981 | Elsel | |
| 4,404,609 A | 9/1983 | Jones, Jr. | |
| 4,546,398 A | 10/1985 | Toda et al. | |
| 4,636,897 A | 1/1987 | Nakamura et al. | |
| 4,646,429 A | 3/1987 | Mori | |
| 4,779,463 A | 10/1988 | Woodruff | |
| 4,855,854 A | 8/1989 | Wada et al. | |
| 4,943,882 A | 7/1990 | Wada et al. | |
| 5,027,247 A | 6/1991 | Nakanishi | |
| 5,181,151 A | 1/1993 | Yamashita et al. | |
| 5,225,953 A | 7/1993 | Wada et al. | |
| 5,393,233 A | 2/1995 | Hong et al. | |
| 5,578,857 A | 11/1996 | Hong et al. | |
| 6,261,918 B1 | 7/2001 | So | |
| 6,292,329 B1 | 9/2001 | Sato et al. | |
| 6,315,839 B1 | 11/2001 | Pinarbasi et al. | |
| 6,353,995 B1 | 3/2002 | Sasaki et al. | |
| 6,433,970 B1 | 8/2002 | Knapp et al. | |
| 6,475,062 B1 | 11/2002 | Kubota et al. | |
| 6,501,619 B1 | 12/2002 | Sherrer et al. | |
| 6,504,675 B1 | 1/2003 | Shukh et al. | |
| 6,513,228 B1 | 2/2003 | Khizroev et al. | |

(Continued)

*Primary Examiner* — Angel Castro

(57) ABSTRACT

A method and system for providing a perpendicular magnetic recording transducer are disclosed. The method and system include providing a metallic underlayer and providing an insulator, at least a portion of which is on the metallic underlayer. The method and system also include forming a trench in the insulator. The bottom of the trench is narrower than the top of the trench and includes a portion of the metallic underlayer. The method and system also include providing a nonmagnetic seed layer that substantially covers at least the bottom and sides of the trench. The method and system also include plating a perpendicular magnetic pole material on at least a portion of the seed layer and removing a portion of the perpendicular magnetic pole material. A remaining portion of the perpendicular magnetic pole material forms a perpendicular magnetic recording pole.

12 Claims, 13 Drawing Sheets

(56) References Cited

U.S. PATENT DOCUMENTS

| | | |
|---|---|---|
| 6,522,007 B2 | 2/2003 | Kouno et al. |
| 6,587,314 B1 | 7/2003 | Lille |
| 6,709,322 B2 | 3/2004 | Saldana et al. |
| 6,740,471 B1 | 5/2004 | Lu et al. |
| 6,743,642 B2 | 6/2004 | Costrini et al. |
| 6,751,054 B2 | 6/2004 | Sato et al. |
| 6,757,141 B2 | 6/2004 | Santini et al. |
| 6,784,548 B2 | 8/2004 | Kouno et al. |
| 6,795,277 B2 | 9/2004 | Tsuchiya et al. |
| 6,807,027 B2 | 10/2004 | McGeehin et al. |
| 6,808,442 B1 | 10/2004 | Wei et al. |
| 6,809,899 B1 | 10/2004 | Chen et al. |
| 6,833,979 B1 | 12/2004 | Knapp et al. |
| 6,836,957 B2 | 1/2005 | Kobayashi |
| 6,843,707 B2 | 1/2005 | Saldana et al. |
| 6,876,518 B2 | 4/2005 | Khizroev et al. |
| 6,876,519 B1 | 4/2005 | Litvinov et al. |
| 6,952,867 B2 | 10/2005 | Sato |
| 6,960,281 B2 | 11/2005 | Han et al. |
| 7,024,756 B2 | 4/2006 | Le et al. |
| 7,132,221 B2 | 11/2006 | Chen et al. |
| 7,206,166 B2 | 4/2007 | Notsuke et al. |
| 7,227,720 B2 | 6/2007 | Sasaki et al. |
| 7,296,339 B1 | 11/2007 | Yang et al. |
| 7,444,740 B1 * | 11/2008 | Chung et al. ............... 29/603.16 |
| 7,463,448 B2 * | 12/2008 | Sasaki et al. ............ 360/119.01 |
| 7,508,627 B1 | 3/2009 | Zhang et al. |
| 7,518,824 B2 | 4/2009 | Sasaki et al. |
| 7,552,523 B1 | 6/2009 | He et al. |
| 7,898,773 B2 * | 3/2011 | Han et al. ...................... 360/319 |
| 7,911,735 B1 | 3/2011 | Sin et al. |
| 8,141,235 B1 | 3/2012 | Zhang |
| 8,149,536 B1 | 4/2012 | Yang et al. |
| 8,310,785 B1 * | 11/2012 | Zhang et al. ................ 360/125.1 |
| 8,333,008 B1 | 12/2012 | Sin et al. |
| 8,432,637 B2 * | 4/2013 | Bonhote et al. .......... 360/125.09 |
| 8,468,682 B1 | 6/2013 | Zhang |
| 8,636,913 B2 * | 1/2014 | Mao et al. ....................... 216/22 |
| 2001/0008501 A1 | 7/2001 | Sekine |
| 2001/0035357 A1 | 11/2001 | Sasaki |
| 2002/0006013 A1 | 1/2002 | Sato et al. |
| 2002/0012195 A1 | 1/2002 | Lahiri et al. |
| 2002/0012196 A1 | 1/2002 | Obara |
| 2002/0151254 A1 | 10/2002 | Saldana et al. |
| 2002/0190382 A1 | 12/2002 | Kouno et al. |
| 2002/0191336 A1 | 12/2002 | Hsiao et al. |
| 2003/0039064 A1 | 2/2003 | Khizroev et al. |
| 2003/0071263 A1 | 4/2003 | Kouno et al. |
| 2003/0117749 A1 | 6/2003 | Shukh et al. |
| 2004/0001283 A1 | 1/2004 | Fontana et al. |
| 2004/0008446 A1 | 1/2004 | Schmidt |
| 2004/0008451 A1 | 1/2004 | Zou et al. |
| 2004/0032692 A1 | 2/2004 | Kobayashi |
| 2004/0075927 A1 | 4/2004 | Gill |
| 2004/0102138 A1 | 5/2004 | Saldana et al. |
| 2004/0150912 A1 | 8/2004 | Kawato et al. |
| 2004/0161576 A1 | 8/2004 | Yoshimura |
| 2004/0252415 A1 | 12/2004 | Shukh et al. |
| 2004/0257711 A1 | 12/2004 | Ushiyama et al. |
| 2005/0011064 A1 | 1/2005 | Lee |
| 2005/0024779 A1 | 2/2005 | Le et al. |
| 2005/0068671 A1 | 3/2005 | Hsu et al. |
| 2006/0044681 A1 | 3/2006 | Le et al. |
| 2006/0109588 A1 | 5/2006 | Le et al. |
| 2006/0139802 A1 | 6/2006 | Sasaki et al. |
| 2006/0168603 A1 | 7/2006 | Goto |
| 2008/0148301 A1 | 6/2008 | Masaoka et al. |
| 2008/0184278 A1 | 7/2008 | Leigh et al. |
| 2008/0278861 A1 | 11/2008 | Jiang et al. |
| 2008/0297945 A1 | 12/2008 | Han et al. |
| 2010/0078406 A1 | 4/2010 | Guthrie et al. |
| 2010/0112486 A1 | 5/2010 | Zhang et al. |

* cited by examiner

METHOD AND SYSTEM FOR PROVIDING PERPENDICULAR MAGNETIC RECORDING TRANSDUCERS UTILIZING A DAMASCENE APPROACH

CROSS-REFERENCE TO RELATED APPLICATIONS

This application is a divisional of U.S. patent application Ser. No. 13/412,860, filed on Mar. 6, 2012, which is hereby incorporated by reference in its entirety and which is a divisional of U.S. patent application Ser. No. 11/450,607, filed on Jun. 9, 2006, issued as U.S. Pat. No. 8,141,235, which is hereby incorporated by reference in its entirety.

FIELD OF THE INVENTION

The present invention relates to magnetic recording technology, and more particularly to a method and system for providing perpendicular magnetic recording transducers.

BACKGROUND

FIG. 1 depicts a portion of conventional head 1 including a conventional perpendicular magnetic recording (PMR) transducer 10 and conventional read transducer 40 separated by an insulator 6, as viewed from the air-bearing surface (ABS). The conventional head 10 is formed using a damascene approach, described below. For clarity, the conventional PMR transducer 10 is not drawn to scale. Also depicted is the substrate 2, which may be part of a body of a slider (not separately depicted in FIG. 1).

The conventional PMR transducer 10 includes a conventional first pole 12, alumina insulating layer 14, alumina underlayer 16 that may be considered part of the alumina insulating layer 14, a conventional PMR pole 18 that typically includes a seed layer (not shown), insulating layer 20, shield gap 26, top shield 28, and insulating layer 30. Note that in certain other embodiments, the top shield 28 may also act as pole during writing using the conventional PMR transducer 10. The conventional PMR pole 18 and the top shield 80 are surrounded by insulating layers 20 and 30, respectively. The conventional PMR pole 18 has sidewalls 22 and 24.

In conventional applications, the height of the conventional PMR pole 18 is typically less than approximately three-tenths micrometer. The conventional PMR pole 18 also has a negative angle such that the top of the conventional PMR pole 18 is wider than the bottom of the conventional PMR pole 18. Stated differently, the angle θ of the sidewalls is less than ninety degrees in the conventional PMR pole 18 of FIG. 1. A pole having this height and shape is desirable for use in PMR applications.

FIG. 2 is a flow chart depicting a conventional method 50 for fabricating the conventional PMR transducer 10 using a damascene process. For simplicity, some steps are omitted. The conventional method 50 is described in the context of the conventional PMR head 1. The conventional method 10 starts after formation of the first pole 12 and the alumina 14. The alumina underlayer 16 and insulating layer 20 are formed. Thus, the insulating layers 14, 16, and 20 may be part of a single, larger insulating layer. A mask is formed, via step 52. The mask is typically a reactive ion etch (RIE) mask having an aperture that is the same width as the top of the conventional PMR pole 18. A RIE is performed to form a trench in the insulating layer 20, via step 54. The trench in the insulating layer 20 has substantially the same shape as the conventional PMR pole 18. The trench is refilled using the material for the conventional PMR pole 18, via step 56. The material may be planarized, via step 58. Consequently, the conventional PMR pole 18 remains. Fabrication of the PMR head 1 is then completed, via step 60.

Although the conventional method 50 may be used to fabricate the conventional PMR pole 18, there are drawbacks. For example, the changes in the length of the RIE performed in step 54 results in varying thicknesses of the trench. Consequently, the height, h, of the conventional PMR pole 18 may vary. Such a variation between conventional PMR poles 18 is undesirable.

Accordingly, what is needed is an improved method for fabricating a PMR head.

SUMMARY

A method and system for providing a perpendicular magnetic recording transducer are disclosed. The method and system comprise providing a metallic underlayer and providing an insulator, at least a portion of which is on the metallic underlayer. The method and system also comprise forming a trench in the insulator. The bottom of the trench is narrower than the top of the trench and includes a portion of the metallic underlayer. The method and system further comprise providing a nonmagnetic seed layer that substantially covers at least the bottom and sides of the trench. The method and system also comprise plating a perpendicular magnetic pole material on at least a portion of the seed layer and removing a portion of the perpendicular magnetic pole material. A remaining portion of the perpendicular magnetic pole material forms a perpendicular magnetic recording pole.

DETAILED DESCRIPTION OF THE PREFERRED EMBODIMENTS

The present invention is related to co-pending U.S. patent application Ser. No. 11/367,819 entitled "METHOD AND SYSTEM FOR PROVIDING PERPENDICULAR MAGENTIC RECORDING TRANSDUSCERS" (K35R 1969), filed on Mar. 3, 2006 and assigned to the assignee of the present application. Applicant hereby incorporates by reference the above-identified co-pending patent application.

Figure 1:
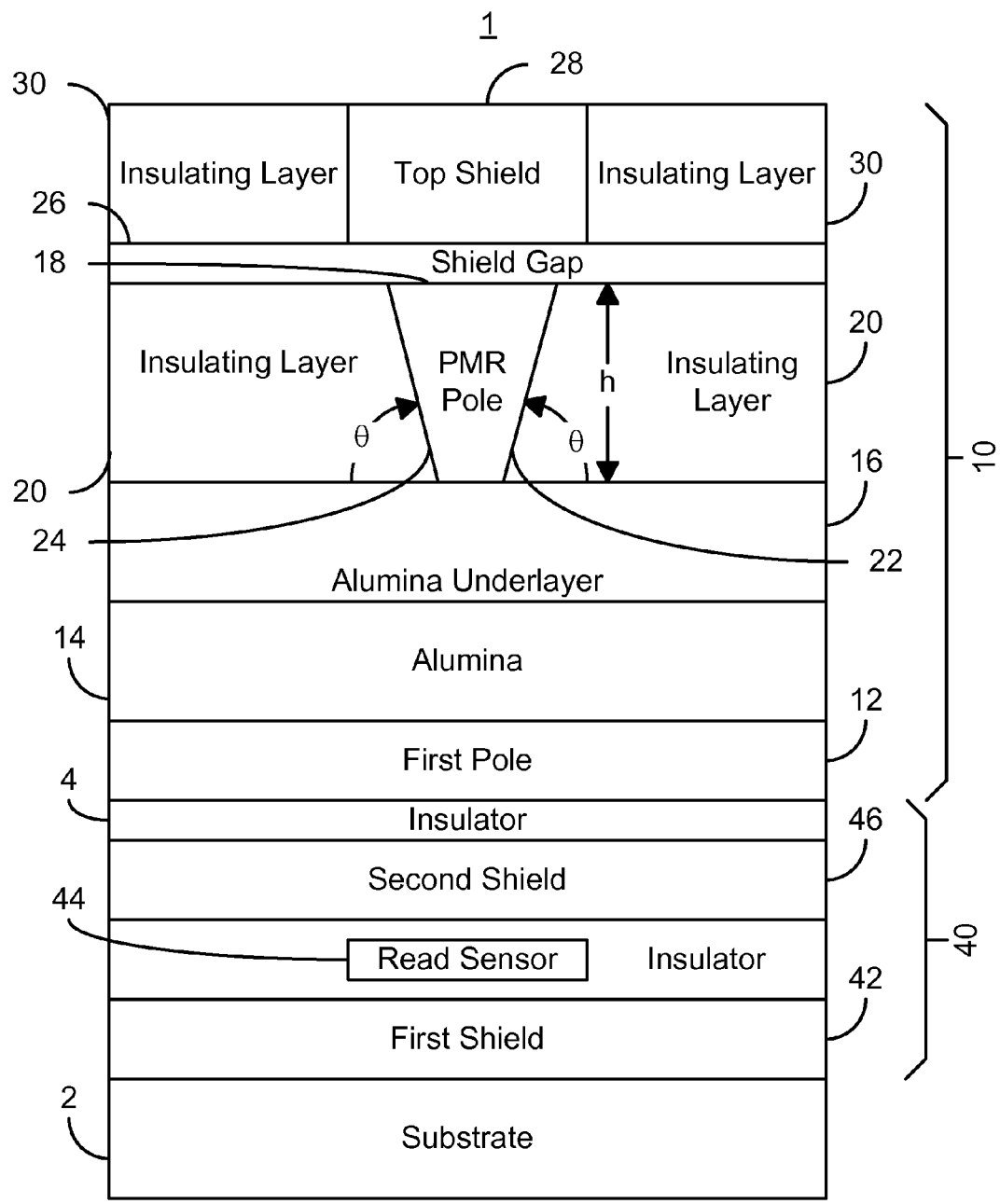
FIG. 1 is diagram depicting a conventional perpendicular magnetic recording head.
Figure 2:
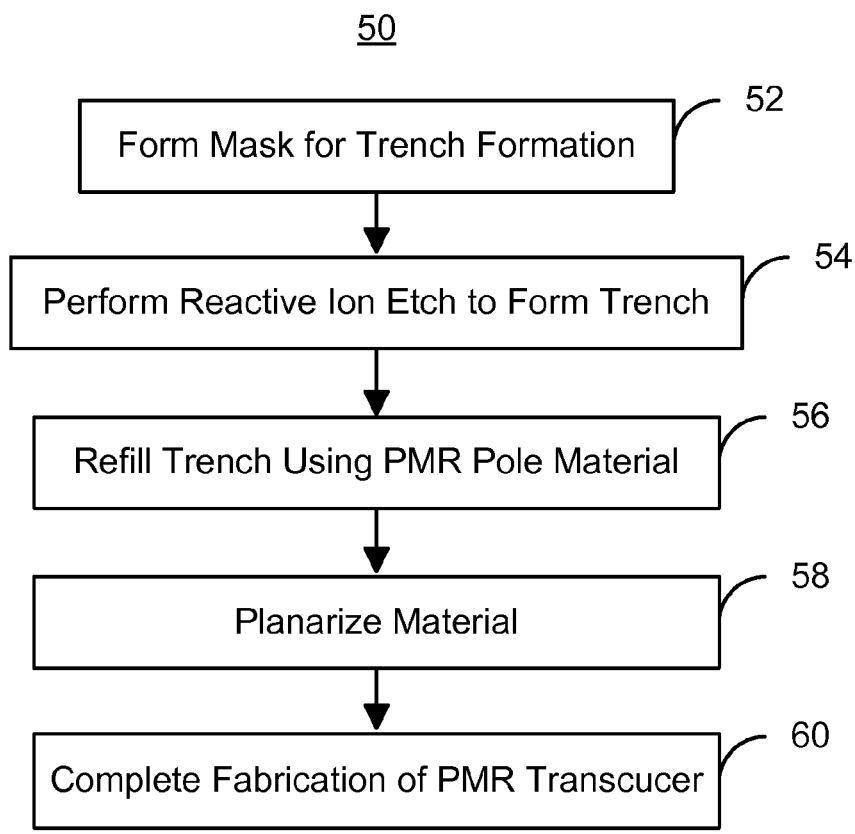
FIG. 2 is a flow chart depicting a conventional method for fabricating a perpendicular magnetic recording pole using a damascene process.
Figure 3:
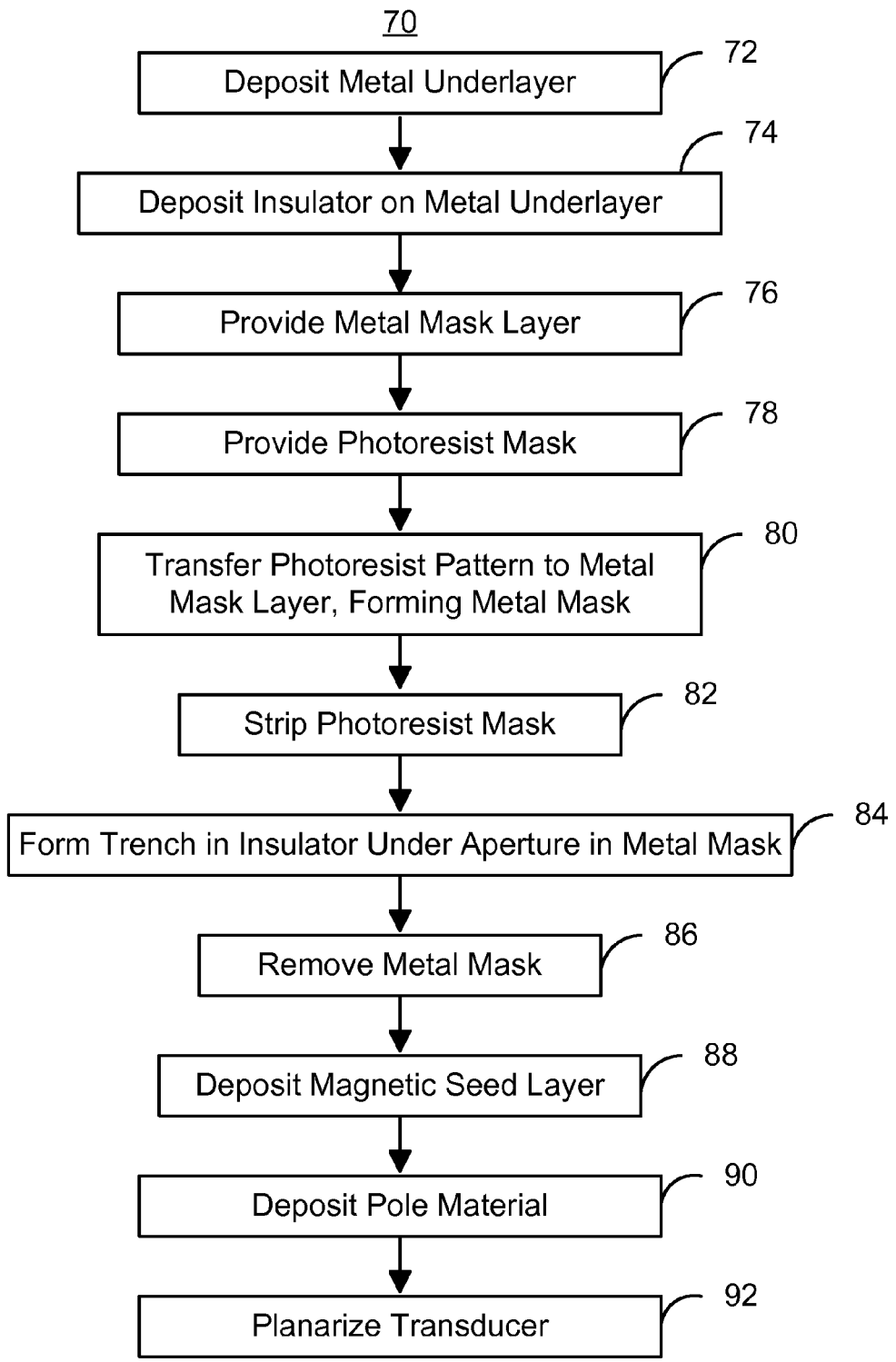
FIG. 3 is a flow chart depicting a method for fabricating a perpendicular magnetic recording pole using a more recently developed damascene process.

In the above-identified co-pending application, a method for forming a PMR transducer is described. FIG. 3 is a flow chart depicting a method 70 for fabricating a perpendicular magnetic recording pole using a more recently developed damascene process described in the above-identified co-pending patent application. For simplicity, some steps may be omitted. The method 70 is preferably used for a PMR head including a read transducer (not shown) and a PMR transducer. The method 700 also preferably commences after formation of a first pole and formation of a portion of the second pole. A metal underlayer is provided, via step 72. An insulator is provided on the metal layer, via step 74. In a preferred embodiment, the insulator is alumina. A metal mask layer is deposited on the insulator, via step 76. In some embodiments, the metal mask layer may include NiFe or NiCr. A photoresist mask is provided on the metal mask layer, via step 78. The photoresist mask has an aperture therein. The photoresist mask may be a bilayer. Thus, the photoresist mask may have an undercut in the photoresist layer(s) around the aperture. The PMR pole for the transducer (not shown) is formed under the aperture in the photoresist mask. The pattern in the photoresist mask is transferred to the metal mask layer, via step 80. Thus, the metal mask includes an aperture under the aperture in the photoresist mask. The transfer in step 80 may be performed using an ion beam etch (IBE) or RIE. The photoresist mask is stripped, via step 82.

A trench is formed in the insulator under the aperture, via step 84. The metal mask thus acts as a mask for trench formation, exposing the portions of the insulator in which the trench is to be formed and covering adjacent regions. The trench has a top that is wider than the bottom. The bottom of the trench is on the magnetic seed layer. The top of the trench formed in step 84 may be less than or equal to 0.14 micron. The metal mask is removed, via step 86. In some embodiments, step 86 may be performed using a RIE process. A magnetic seed layer is deposited in the trench, via step 88. Examples of the magnetic seed layer include but are not limited to NiFe, CoNiFe, and CoFe. A pole material is plated in the seed layer, via step 90. Thus, the pole material is magnetic and may include multiple sub-layers. A planarization is performed, via step 92. Consequently, a portion of the magnetic pole material may be removed. The portion of the magnetic pole material remaining in the trench in combination with the magnetic seed layer may form a PMR pole. Processing of the PMR transducer may then be completed.

Thus, using the method 70, a PMR transducer analogous to conventional PMR transducer 10 may be provided. Because the metal layer provided in step 72 is the bottom of the trench, variations in the height of the PMR pole may be reduced. Although the method 70 functions well for its intended purpose, plating of the pole material in step 90 may be difficult for lower pole widths. In particular, assuming the pole width is measured at the top of the PMR pole, when the pole width is less than or equal to approximately 0.14 micron, plating of the pole material may be problematic. Using the method 70, the trench has the same shape and width as the PMR pole. It is believed that the seed layer provided in step 90 may be unable to adequately cover the sidewalls of the trench formed in step 84 when the pole width, and thus the trench width, are less than or equal to approximately 0.14 micron. As a result, the material(s) in the pole material may be unable to adequately adhere to the underlying insulator. Thus, the pole material is unable to remain in the trench and the yield for the method 70 may be low.

Figure 4:
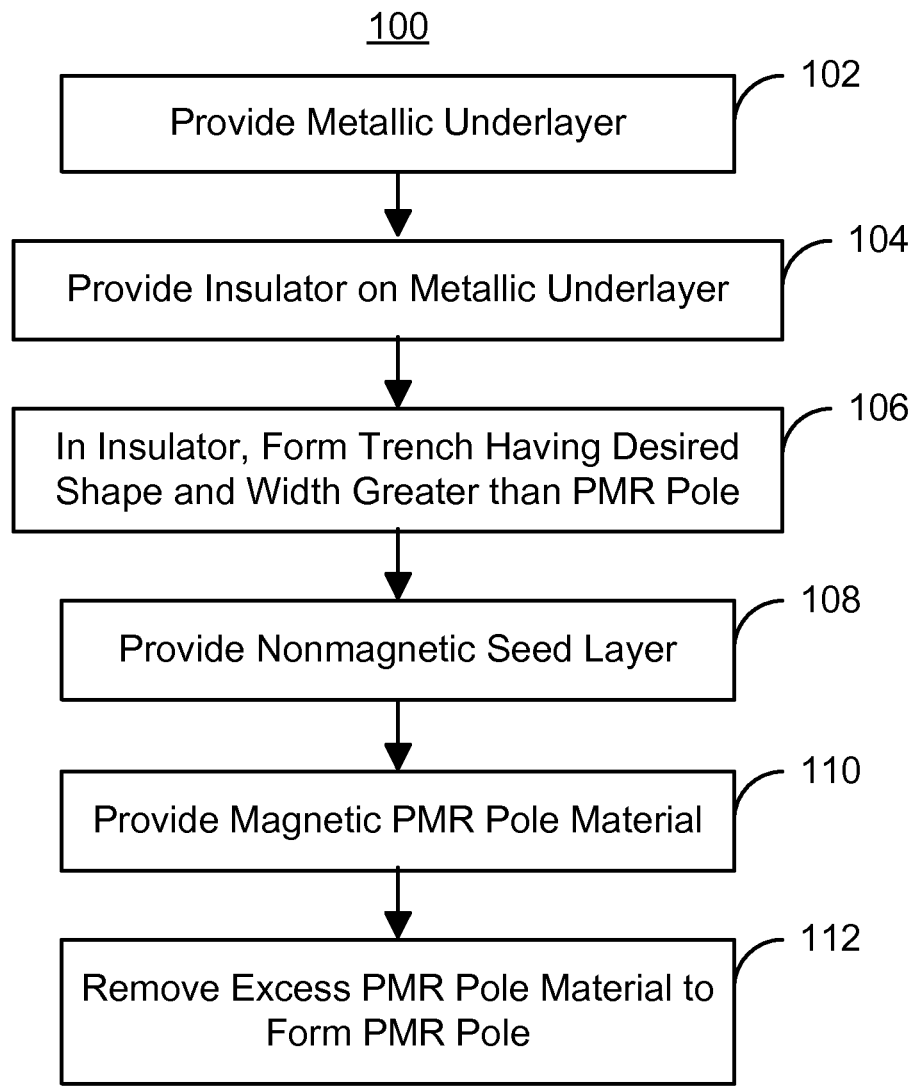
FIG. 4 is a flow chart depicting one embodiment of a method for fabricating a perpendicular magnetic recording pole in accordance with an exemplary embodiment of the present invention.

FIG. 4 is a flow chart depicting one embodiment of a method for fabricating a PMR pole in accordance with an exemplary embodiment of the present invention. For simplicity, some steps may be omitted. The method 100 is preferably used for a PMR head including a read transducer (not shown) and a PMR transducer. The method 100 also preferably commences after formation of a first pole, formation of a portion of the second pole, and, in some embodiments, formation of an insulating layer above the first pole.

A metallic underlayer is formed, via step 102. The metallic may be formed on an underlying insulator. In such an embodiment, a shallow trench is may be formed in the insulating layer, and the metallic underlayer is formed in the trench. However, in another embodiment, the metallic underlayer may be part of another structure, such as a pole. The metallic underlayer may include nonmagnetic metallic materials. Examples of such materials include, but are not limited to Cr, NiCr, NiNb, Ru, and Ta.

An insulator is provided on at least part of the metallic underlayer, via step 104. In one embodiment, the insulator substantially covers all of the metallic underlayer. In another embodiment, the insulator may cover only a portion of the metallic underlayer. In a preferred embodiment, the insulator is alumna. The steps 102 and 104 are analogous to the method 70 depicted in FIG. 3. Referring back to FIG. 4, a trench is formed in the insulator, via step 106. In a preferred embodiment, step 106 is performed using a RIE. The trench has a top, a bottom narrower than the top, and sides. The bottom of the trench includes a portion of the metallic underlayer. Thus, the metallic underlayer is preferably a stop layer for the process used to form the trench in the insulator. The top of the trench formed in step 106 may have a width of at least 0.14 micron and not more than 0.34 micron. In a preferred embodiment, the top of trench has a width of at least 0.2 micron and not more than 0.28 micron. Thus, the trench may have a width that is greater than or equal to the width of the trench formed using the method 70 depicted in FIG. 3. Referring back to FIG. 4, the trench formed in step 106 has a width that is greater than the PMR pole being formed in the PMR transducer.

A nonmagnetic seed layer is provided, via step 108. The nonmagnetic seed layer substantially covering at least the bottom and sides of the trench. The nonmagnetic seed layer may have a thickness of at least three hundred Angstroms and not more than seven hundred Angstroms. In a preferred embodiment, the nonmagnetic seed layer has a thickness of at least four hundred Angstroms and not more than six hundred Angstroms. In some embodiments, the nonmagnetic seed layer may act as a stop layer for a planarization process, such as a chemical mechanical planarization (CMP). In such embodiments, the nonmagnetic seed layer may include at least one of Ru and Ta. However, the nonmagnetic seed layer might include other and/or different materials. In other embodiments, the nonmagnetic seed layer may not act as a stop layer for a planarization process. In such embodiments, the nonmagnetic seed layer might include at least one of NiNb, NiCr, Ti, Cr, and Au. However, the nonmagnetic seed layer might include other and/or different materials.

A PMR material is plated on at least a portion of the seed layer, via step 110. The PMR material is magnetic and may include one or more materials. Moreover, the PMR material may include multiple layers. In addition, the PMR material fills the trench. A portion of the PMR pole material is removed, via step 112. Step 112 is preferably a planarization step, such as a CMP. Thus, a remaining portion of the PMR pole material, residing primarily in the trench, forms a PMR pole. The width of the PMR pole, as measured at the top of the PMR pole, has a width of at least 0.08 micron and not more than 0.17 micron.

The method 100 allows for formation of a PMR pole. Because the thickness of the insulator is known and the metallic underlayer resides at the bottom of the trench, the height of the trench is known. Consequently, the height of the PMR pole is known and variations in the height of the PMR pole may be reduced using the method 100. In addition, because of the use of the nonmagnetic seed layer, only the portion of the perpendicular magnetic pole material remaining after step 112 forms the PMR pole. Stated differently, because it is nonmagnetic, the seed layer is not part of the PMR pole. As a result, the trench formed in step 106 may be made wider without affecting the width of the PMR pole. The nonmagnetic seed layer is, therefore, better able to adhere to both the sides and bottom of the trench and form a continuous layer within the trench. The PMR pole material is better able to adhere to the seed layer and remain in the trench because the nonmagnetic seed layer may form a more continuous layer within the trench. Thus, the yield is improved using the method 100.

Figure 5:
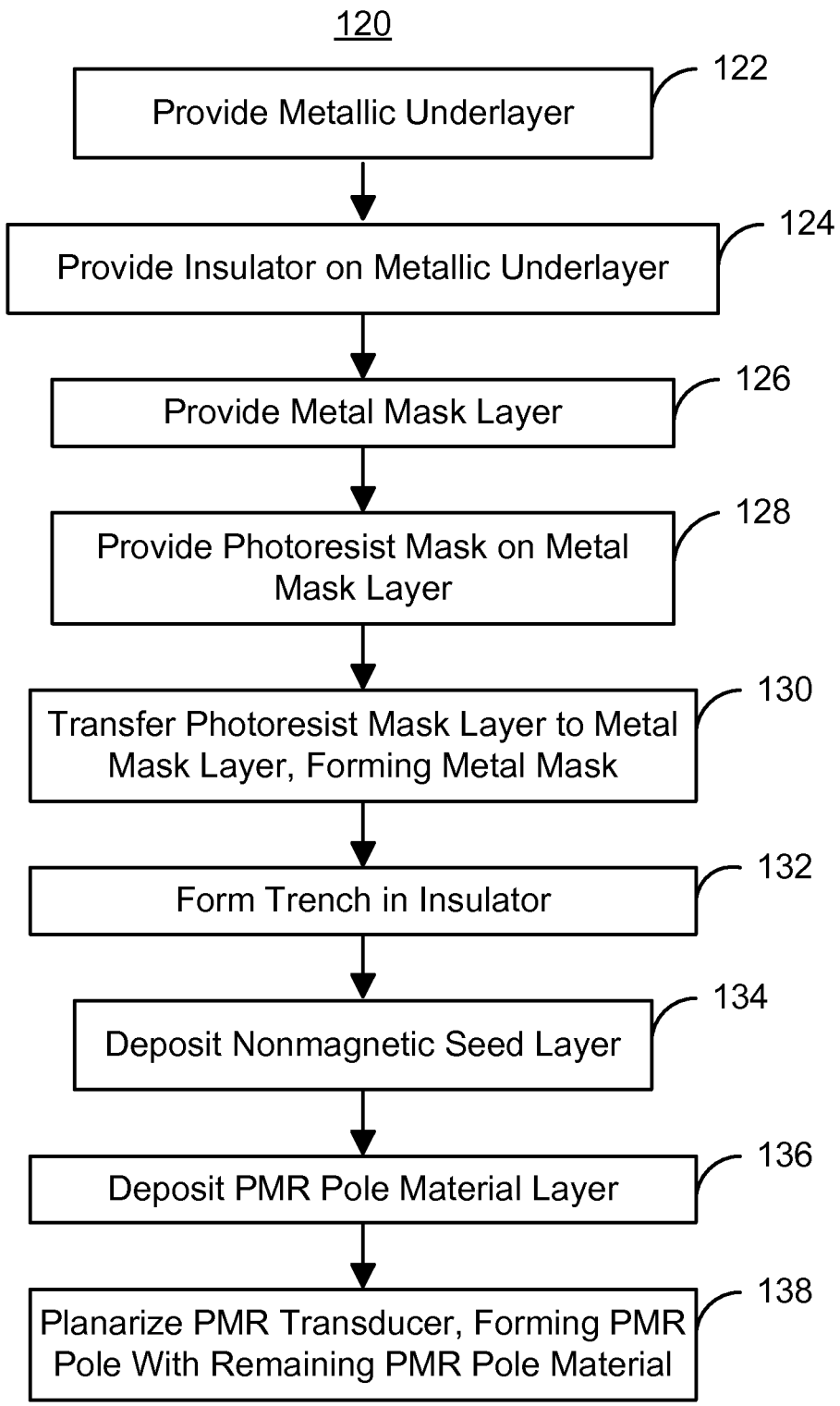
FIG. 5 is a flow chart depicting another embodiment of method for fabricating a perpendicular magnetic recording pole in accordance with an exemplary embodiment of the present invention.

FIG. 5 is a flow chart depicting another embodiment of method 120 for fabricating a perpendicular magnetic recording pole in accordance with an exemplary embodiment of the present invention. For simplicity, some steps may be omitted. The method 120 is preferably used for a PMR head including a read transducer (not shown) and a PMR transducer. The method 120 also preferably commences after formation of a first pole, formation of a portion of the second pole, and, in some embodiments, formation of an insulating layer above the first pole. FIGS. 6A-6G are diagrams of one embodiment of a perpendicular magnetic recording transducer 200 in accordance with an exemplary embodiment of the present invention during fabrication. The perpendicular magnetic recording transducer 200 is thus preferably formed using the method 120.

Figure 6A:
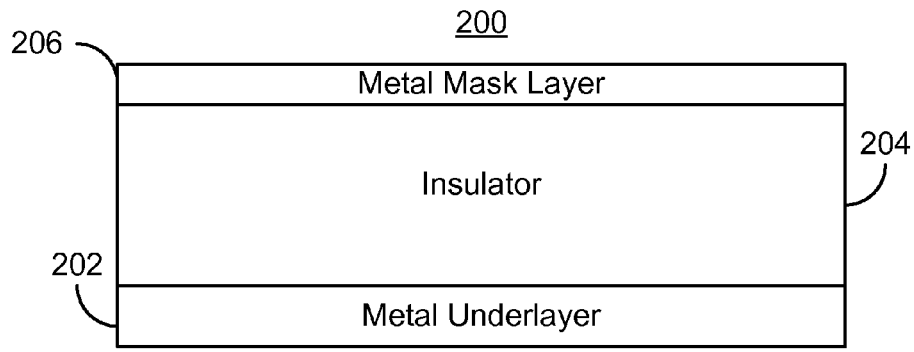
FIGS. 6A-6G are diagrams depicting the ABS views of one embodiment of a perpendicular magnetic recording transducer in accordance with an exemplary embodiment of the present invention during fabrication.

Referring to FIGS. 5 and 6A-6G, a metallic underlayer is formed, via step 122. The metallic may be formed on an underlying insulator. In such an embodiment, a shallow trench is may be formed in the insulating layer, and the metallic underlayer is formed in the trench. However, in another embodiment, the metallic underlayer may be part of another structure, such as a pole. The metallic underlayer may include nonmagnetic metallic materials. Examples of such materials include, but are not limited to Cr, NiCr, NiNb, Ru, and Ta. An insulator is provided on at least part of the metallic underlayer, via step 124. In one embodiment, the insulator substantially covers all of the metallic underlayer. In another embodiment, the insulator may cover only a portion of the metallic underlayer. In a preferred embodiment, the insulator is alumna. The steps 102 and 104 are analogous to the method 70 depicted in FIG. 3. Referring back to FIGS. 5 and 6A-6G, a metal mask layer is provided on the insulator, via step 126. The metal mask layer preferably includes Ru, Ta, or NiCr. In one embodiment, the metal mask layer may also act as a CMP stop layer. FIG. 6A depicts a portion of the perpendicular magnetic recording transducer 200 after step 126 is completed. Thus, a metal underlayer 202, an insulator 204 and metal mask layer 206 are depicted.

Figure 6B:
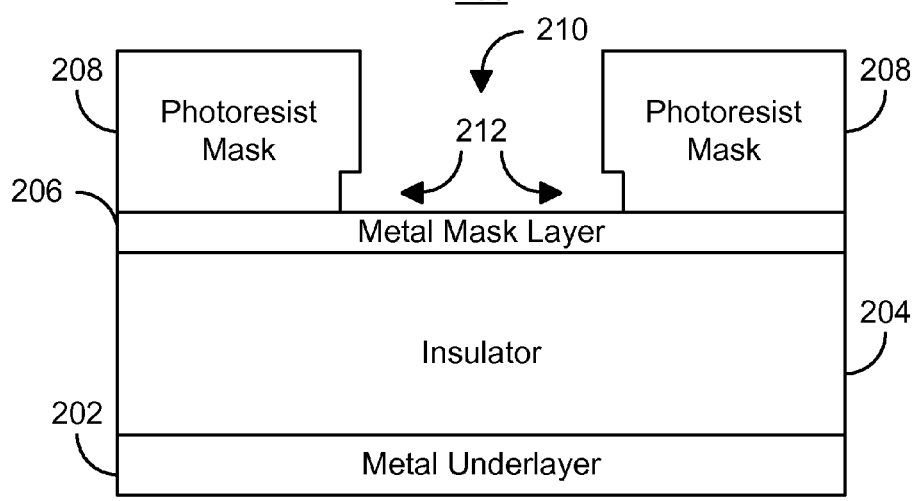

A photoresist mask is provided on the metal mask layer 206, via step 128. In a preferred embodiment, the photoresist mask is a bilayer mask. However, in another embodiment, another number of layers may be used. For example, a single layer photoresist mask might be utilized. FIG. 6B depicts the PMR transducer 200 after step 128 is completed. Thus, a photoresist mask 208 has been provided on the metal mask layer 206. The photoresist mask 208 includes an aperture 210 under which the PMR pole is to be formed. The photoresist mask 208 is preferably a bilayer photoresist mask and thus preferably includes an undercut 212 within the aperture 210.

Figure 6C:
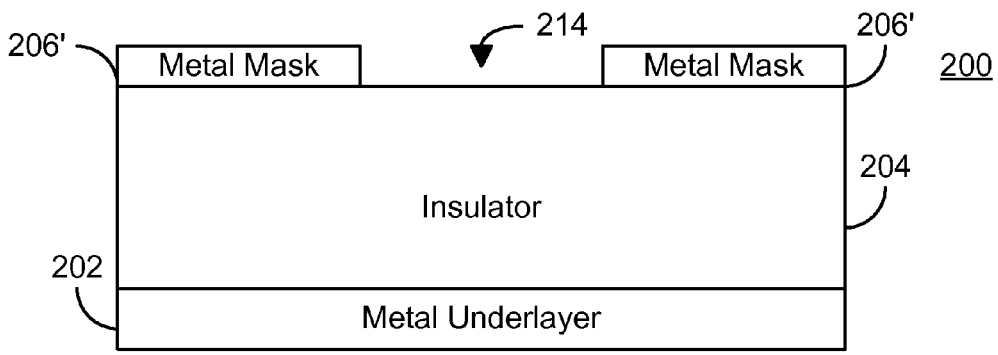

The pattern of the photoresist mask 208 is transferred to the metal mask layer 206, via step 130. Thus, a metal mask is formed. Step 130 preferably includes performing an IBE or RIE to provide a pattern the metal mask. In a preferred embodiment, step 130 includes stripping the photoresist mask 208. FIG. 6C depicts the PMR transducer 200 after step 130 is completed. Consequently, the metal mask 206' having an aperture 214 is depicted. In addition, the photoresist mask 208 is not shown, having been removed in step 130. However, in another embodiment, the photoresist mask 208 might be stripped at another time, for example after the step 132, described below.

Figure 6D:
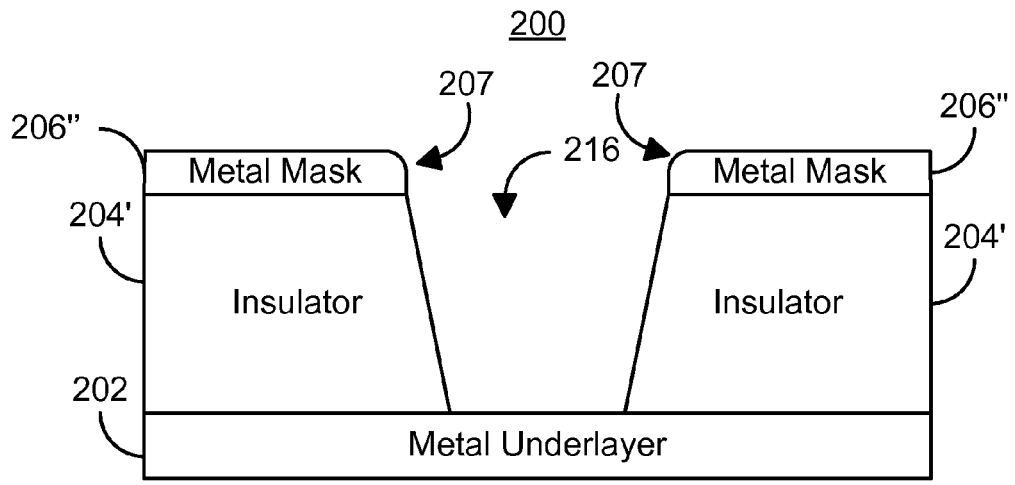

A trench is formed in the insulator 204, via step 132. In a preferred embodiment, step 132 is performed using a RIE. FIG. 6D depicts the PMR transducer after step 132 is completed. The trench 216 has been formed. Moreover, the trench 216 has a bottom that is narrower than the top and that includes a portion of the metallic underlayer 202. The width of the trench, as measured at the trench top, is at least 0.14 micron and not more than 0.34 micron. In a preferred embodiment, the trench 216 has a (top) width of at least 0.2 micron and not more than 0.28 micron. Consequently, the trench 216 has a width that is larger than the desired width of the PMR pole being formed. However, it may be noted that because the metal mask 206' may be exposed to an RIE performed to form the trench 216 in step 132, the corners 207 of the metal mask 206" may be slightly rounded.

Figure 6E:
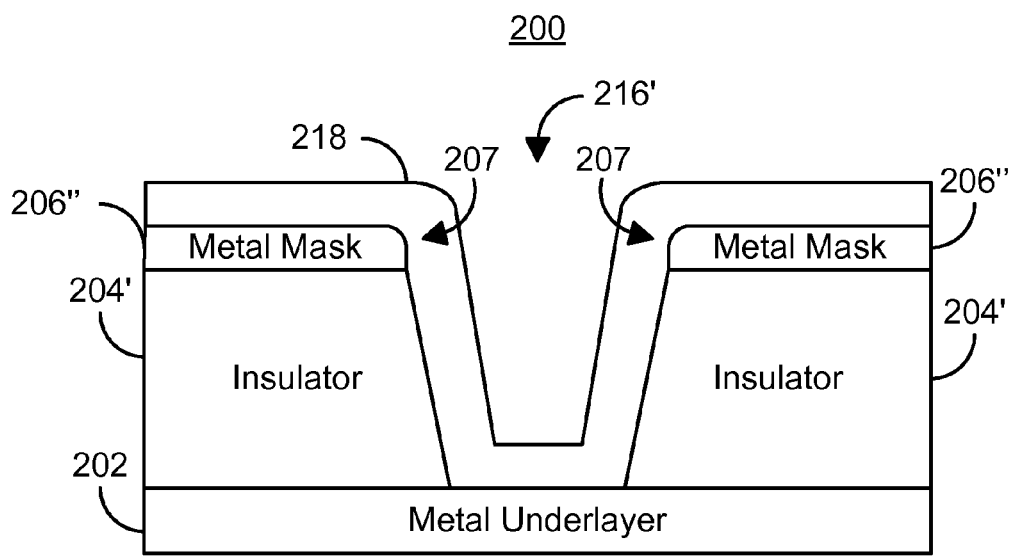

A nonmagnetic seed layer is deposited, via step 134. The nonmagnetic seed layer may also act as a stop layer for a planarization, discussed below. In some embodiments, nonmagnetic seed layer includes at least one of Ru and Ta. Because the width of the trench 216 is sufficiently large, the nonmagnetic seed layer substantially covers at least the bottom and sides of the trench 216. FIG. 6E depicts the PMR transducer 200 after step 134 is completed. Thus, the nonmagnetic seed layer 218 is shown. The nonmagnetic seed layer has 218 a thickness of at least three hundred Angstroms and not more than seven hundred Angstroms. In a preferred embodiment, has a thickness of the nonmagnetic seed layer 218 is at least four hundred Angstroms and not more than six hundred Angstroms. More preferably, the nonmagnetic seed layer 218 has a thickness of at least five hundred Angstroms. As can be seen in FIG. 6E, because of the presence of the nonmagnetic seed layer 218, the width of the remaining portion of the trench 216' has been reduced by substantially twice the thickness of the nonmagnetic seed layer 218. Thus, the remaining portion of the trench may have a width as low as 0.14 micron to 0.18 micron or less.

Figure 6F:
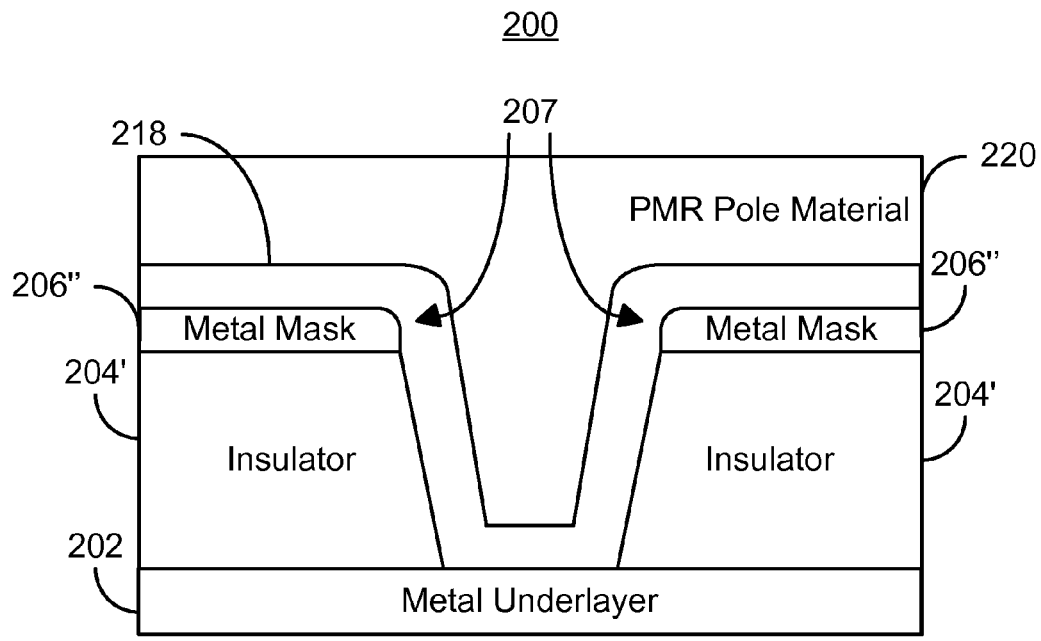

A PMR pole material is provided on at least a portion of the seed layer, via step 136. In a preferred embodiment, step 136 is performed by plating the PMR pole material. The PMR pole material is magnetic and may include one or more materials. Moreover, the PMR pole material may include multiple layers. FIG. 6F depicts the PMR transducer 200 after step 136 is performed. Thus, the PMR pole material 220 has been provided. In addition, the PMR pole material 220 fills the remaining portion of the trench 216'.

Figure 6G:
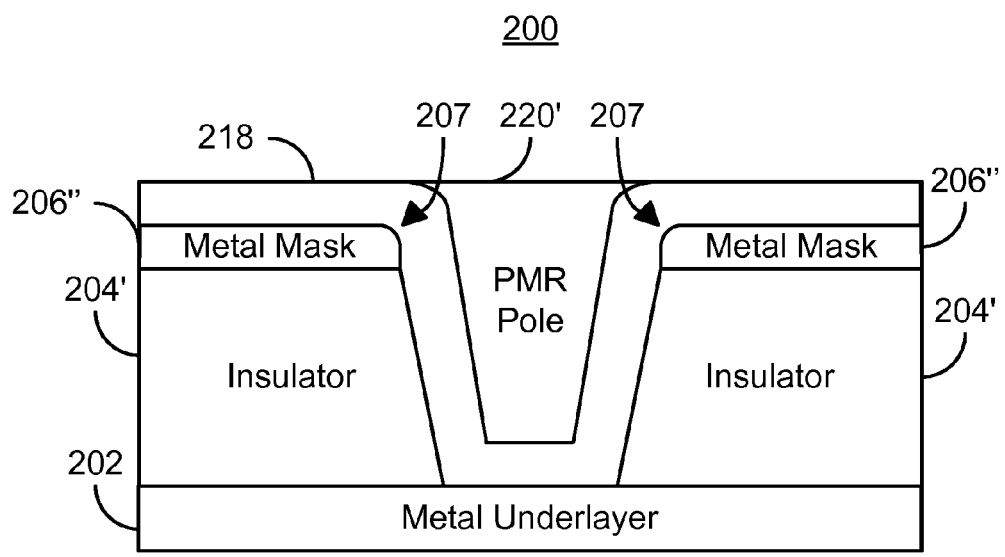

The PMR transducer 200 is planarized, via step 138. In the embodiment shown, the nonmagnetic seed layer 218 is a stop layer for the planarization performed in step 138. In addition, step 138 preferably includes performing a CMP to remove a portion of the perpendicular magnetic pole material. Thus, the nonmagnetic seed layer 218 is a CMP stop layer in the embodiment shown. Moreover, the metal mask 206" may also act as a CMP stop layer for step 138. A remaining portion of the PMR pole material forms the PMR pole. FIG. 6G depicts the PMR transducer 200 after step 138 is completed. Thus, most or all of the nonmagnetic seed layer 218 remains. However, most of the PMR pole material 220 outside of the trench 216 is removed. Consequently, a remaining portion of the PMR pole material forms a PMR pole 220'. Fabrication of the PMR transducer may then be completed. However, in at least some embodiments, at least a portion of the metal mask 206" and at least a portion of the nonmagnetic seed layer 218 on the metal mask and inside the trench 216 remain in the completed PMR transducer 200.

The method 120 thus allows for formation of a PMR pole. Because the thickness of the insulator 204 is known and the metallic underlayer 202 resides at the bottom of the trench 216, the height of the trench 216 is known. Consequently, the height of the PMR pole 220' is known and variations in the height of the PMR pole 220' may be reduced. In addition, because of the use of the nonmagnetic seed layer 218, only the portion of the PMR pole material 220 remaining after step 138 forms the PMR pole 220'. Stated differently, because it is nonmagnetic, the seed layer 218 is not part of the PMR pole 220'. As a result, the trench 216 may be made wider without affecting the width of the PMR pole 220'. The nonmagnetic seed layer 218 is, therefore, better able to adhere to both the sides and bottom of the trench 216 and form a continuous layer within the trench 216. The PMR pole material 220 is thus better able to adhere to the seed layer and remain in the trench 216. The yield may thereby be improved using the method 120. However, it may be noted that because the metal mask 206' may be exposed to an RIE performed to form the trench 216 in step 132, the corners 207 of the metal mask 206" may be rounded. Consequently, the nonmagnetic seed layer 218 and the PMR pole 220' may have rounded corners that may adversely affect performance of the PMR pole 220'.

Figure 7:
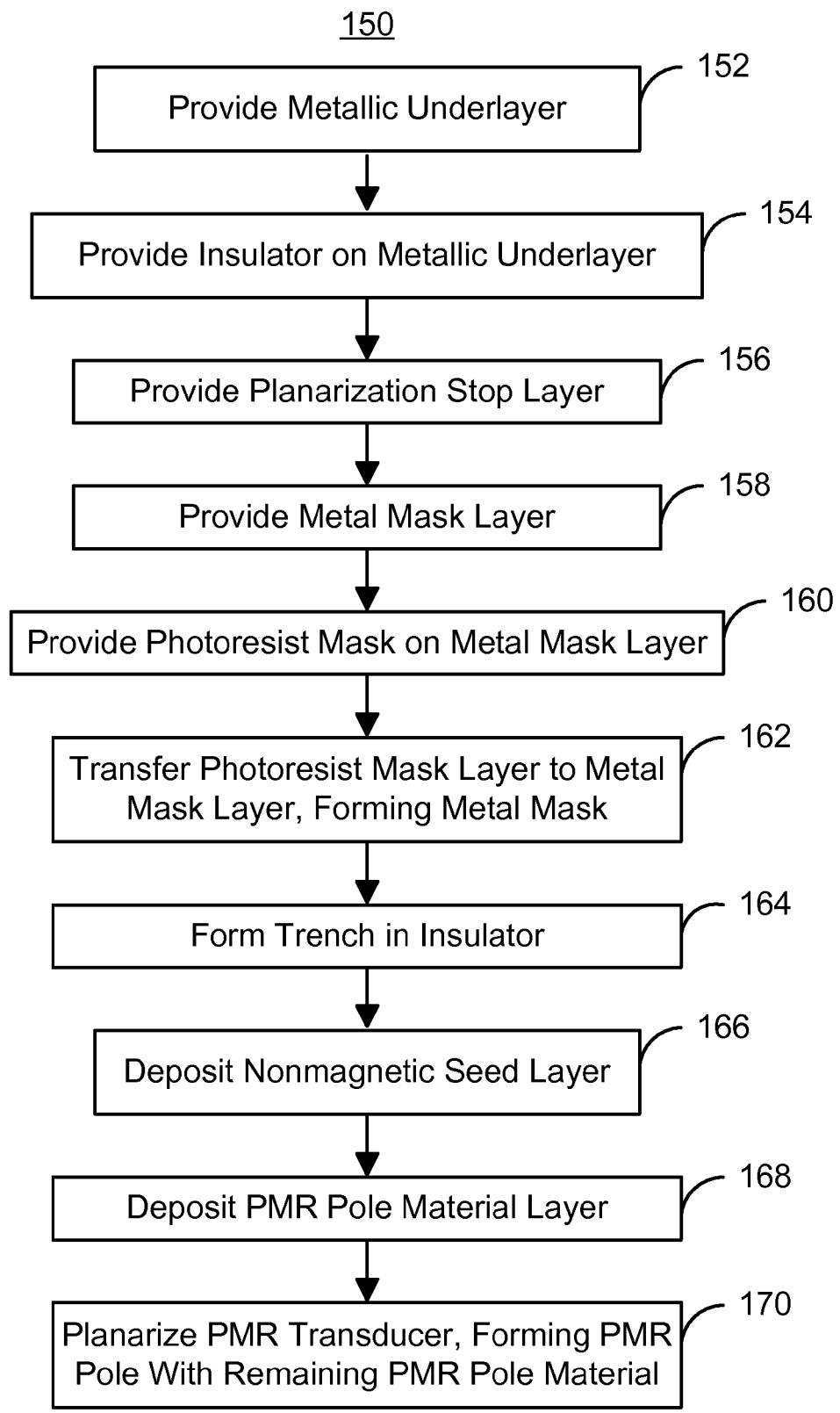
FIG. 7 is a flow chart depicting another embodiment of method for fabricating a perpendicular magnetic recording pole in accordance with an exemplary embodiment of the present invention.

FIG. 7 is a flow chart depicting another embodiment of method 150 for fabricating a perpendicular magnetic recording pole in accordance with an exemplary embodiment of the present invention. For simplicity, some steps may be omitted. The method 120 is preferably used for a PMR head including a read transducer (not shown) and a PMR transducer. The method 120 also preferably commences after formation of a first pole, formation of a portion of the second pole, and, in some embodiments, formation of an insulating layer above the first pole. FIGS. 8A-8G are diagrams of one embodiment of a perpendicular magnetic recording transducer 200 in accordance with an exemplary embodiment of the present invention during fabrication. The perpendicular magnetic recording transducer 200 is thus preferably formed using the method 120.

Figure 8A:
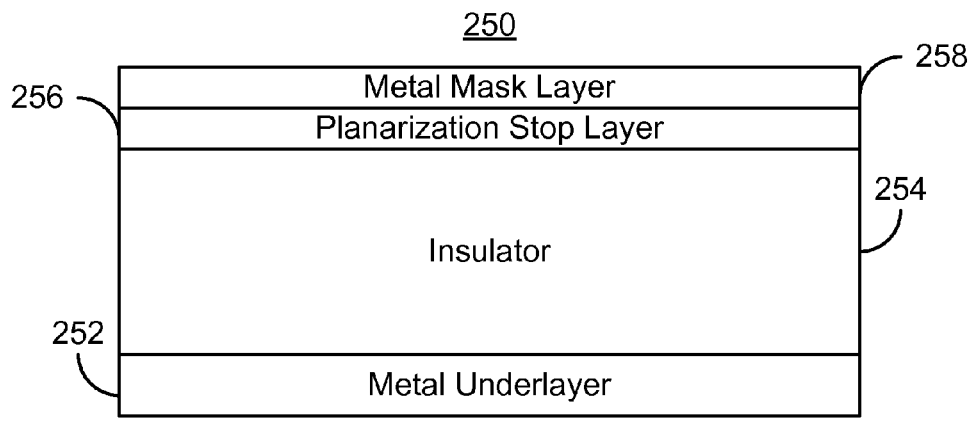
FIGS. 8A-8G are diagrams depicting ABS views of another embodiment of perpendicular magnetic recording transducer in accordance with an exemplary embodiment of the present invention during fabrication.

Referring to FIGS. 7 and 8A-8G, a metallic underlayer is formed, via step 152. The metallic may be formed on an underlying insulator. In such an embodiment, a shallow trench is may be formed in the insulating layer, and the metallic underlayer is formed in the trench. However, in another embodiment, the metallic underlayer may be part of another structure, such as a pole. The metallic underlayer may include nonmagnetic metallic materials. Examples of such materials include, but are not limited to Cr, NiCr, NiNb, Ru, and Ta. An insulator is provided on at least part of the metallic underlayer, via step 154. In one embodiment, the insulator substantially covers all of the metallic underlayer. In another embodiment, the insulator may cover only a portion of the metallic underlayer. In a preferred embodiment, the insulator is alumna. The steps 102 and 104 are analogous to the method 70 depicted in FIG. 3. Referring back to FIGS. 7 and 8A-8G, a planarization stop layer is provided on the insulator, via step 156. In a preferred embodiment, the planarization stop layer is a CMP stop layer. A metal mask layer is provided on the planarization stop layer, via step 158. The metal mask layer preferably includes NiFe or NiCr. FIG. 8A depicts a portion of the perpendicular magnetic recording transducer 250 after step 158 is completed. Thus, a metal underlayer 252, an insulator 254, a planarization stop layer 256, and metal mask layer 258 are depicted.

Figure 8B:
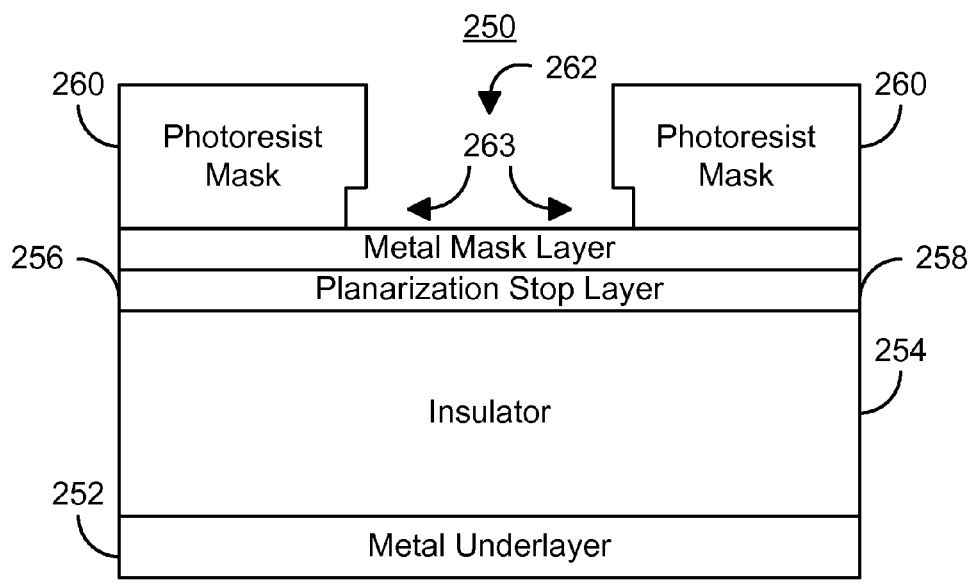

A photoresist mask is provided on the metal mask layer 258, via step 160. In a preferred embodiment, the photoresist mask is a bilayer mask. In another embodiment, the photoresist mask may have another number of layers. For example, the photoresist mask may be a single layer mask. FIG. 8B depicts the PMR transducer 250 after step 160 is completed. Thus, a photoresist mask 260 has been provided on the metal mask layer 258. The photoresist mask 260 includes an aperture 262 under which the PMR pole is to be formed. The photoresist mask 260 is preferably a bilayer photoresist mask and thus preferably includes an undercut 263 within the aperture 262.

Figure 8C:
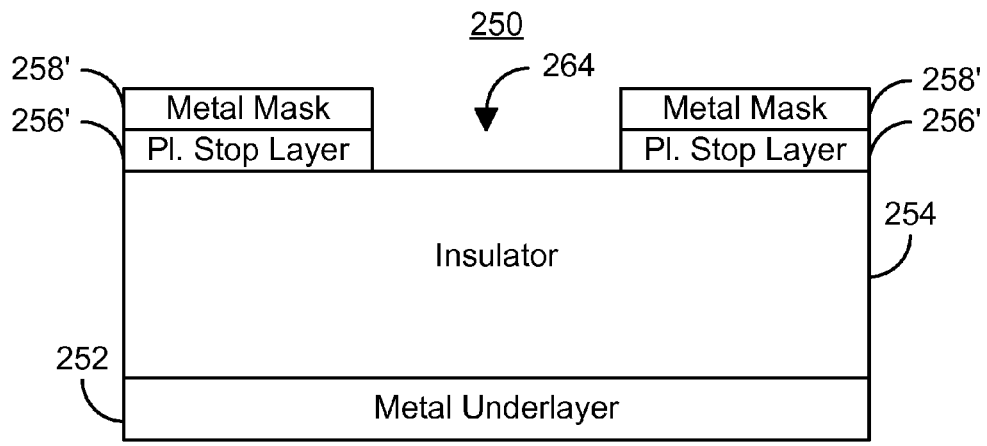

The pattern of the photoresist mask 260 is transferred to the metal mask layer 258 and the planarization stop layer 256, via step 162. Thus, a metal mask and an aperture in the underlying planarization stop layer are formed. Step 162 preferably includes performing an IBE to provide a pattern the metal mask 258 and the aperture in the planarization stop layer 256. In a preferred embodiment, step 162 also includes stripping the photoresist mask 260. FIG. 8C depicts the PMR transducer 250 after step 162 is completed. Consequently, the metal mask 258' and planarization stop layer 256' having aperture 264 are depicted. In addition, the photoresist mask 260 is not shown, having been removed in step 162. However, in another embodiment, the photoresist mask 260 might be stripped at another time, for example after the step 164, described below.

Figure 8D:
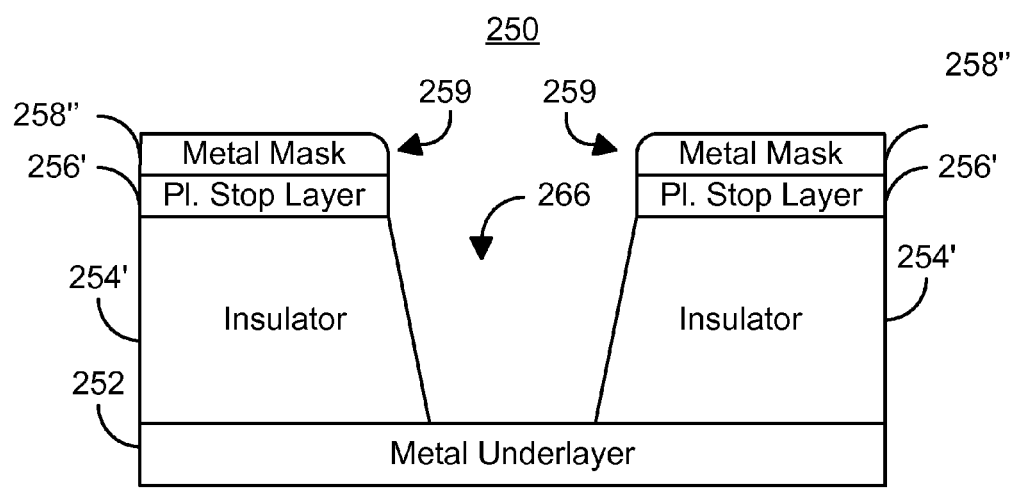

A trench is formed in the insulator 254, via step 164. In a preferred embodiment, step 164 is performed using a RIE. FIG. 8D depicts the PMR transducer after step 164 is completed. The trench 266 has been formed. Moreover, the trench 266 has a bottom that is narrower than the top and that includes a portion of the metallic underlayer 252. The width of the trench, as measured at the trench top, is at least 0.14 micron and not more than 0.34 micron. In a preferred embodiment, the trench 266 has a (top) width of at least 0.2 micron and not more than 0.28 micron. Consequently, the trench 266 has a width that is larger than the desired width of the PMR pole being formed. It may be noted that because the metal mask 258' may be exposed to an RIE performed to form the trench 266 in step 164, the corners 259 of the metal mask 258" may be slightly rounded.

Figure 8E:
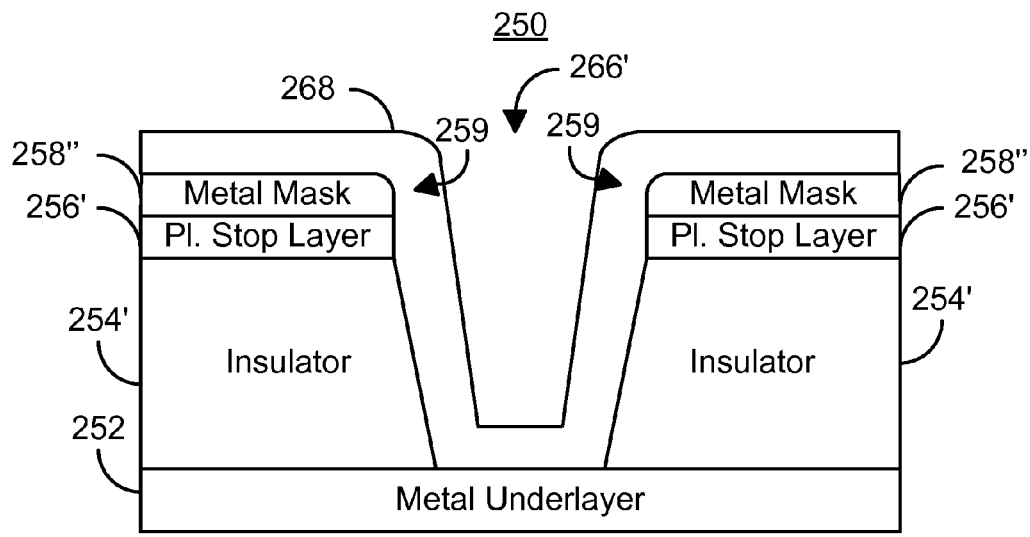

A nonmagnetic seed layer is deposited, via step 166. The nonmagnetic seed layer deposited in step 166 is preferably not a stop layer for the planarization described below. In some embodiments, nonmagnetic seed layer includes at least one of NiNb, NiCr, Ti, Cr, and Au. Because the width of the trench 266 is sufficiently large, the nonmagnetic seed layer substantially covers at least the bottom and sides of the trench 266. FIG. 8E depicts the PMR transducer 250 after step 166 is completed. Thus, the nonmagnetic seed layer 268 is shown. The nonmagnetic seed layer 268 has a thickness of at least three hundred Angstroms and not more than seven hundred Angstroms. In a preferred embodiment, the nonmagnetic seed layer 268 has a thickness of at least four hundred Angstroms and not more than six hundred Angstroms. More preferably, the nonmagnetic seed layer 268 has a thickness of at least five hundred Angstroms. As can be seen in FIG. 8E, because of the presence of the nonmagnetic seed layer 268, the width of the remaining portion of the trench 266' has been reduced by substantially twice the thickness of the nonmagnetic seed layer 268. Thus, the remaining portion of the trench may have a width as low as 0.14 micron to 0.18 micron or less.

Figure 8F:
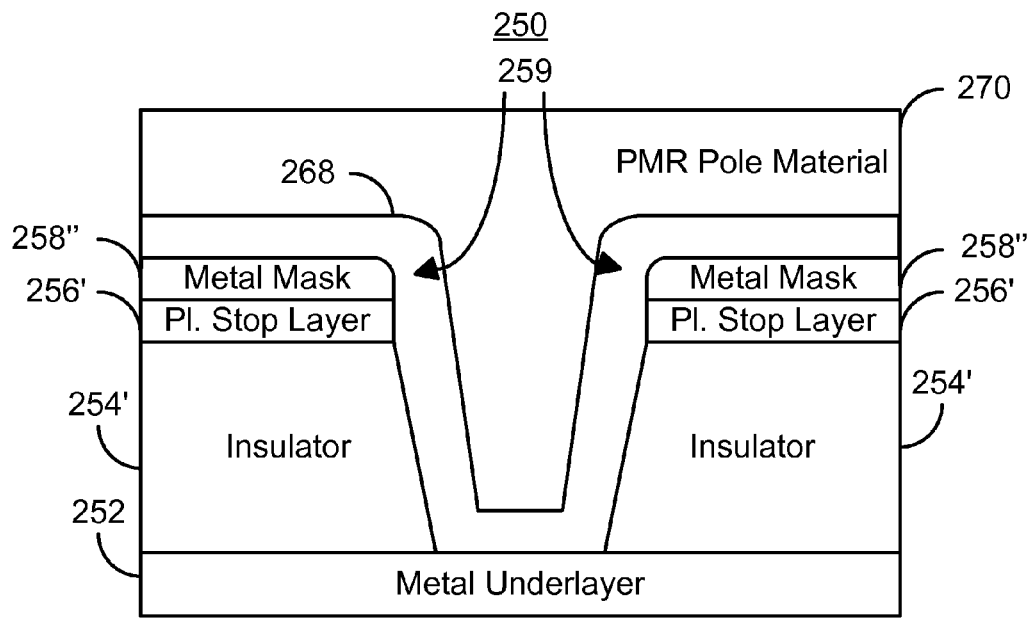

A PMR pole material is provided on at least a portion of the nonmagnetic seed layer 268, via step 168. In a preferred embodiment, step 168 is performed by plating the PMR pole material. The PMR pole material is magnetic and may include one or more materials. Moreover, the PMR pole material may include multiple layers. FIG. 8F depicts the PMR transducer 250 after step 158 is performed. Thus, the PMR pole material 270 has been provided. In addition, the PMR pole material 270 fills the remaining portion of the trench 266'.

Figure 8G:
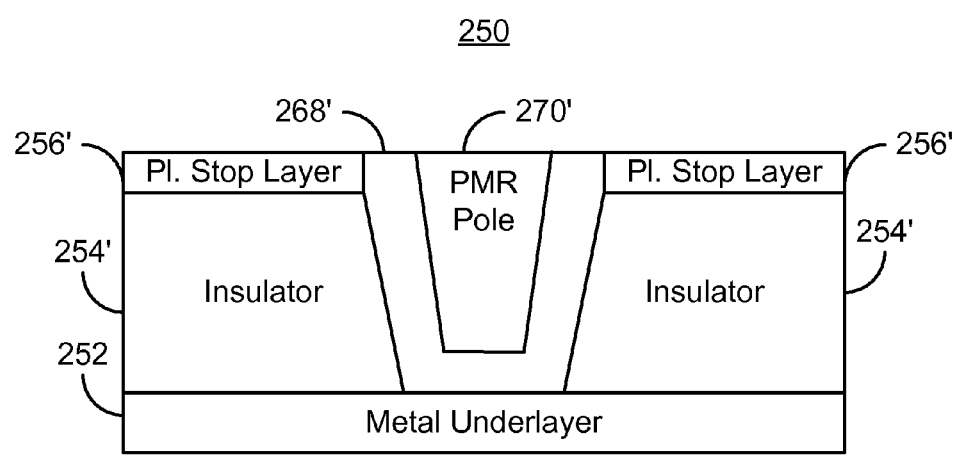

The PMR transducer 250 is planarized, via step 170. In the embodiment shown, the nonmagnetic seed layer 268 outside of the trench 266 and above the stop layer 256' as well as the metal mask 258' are removed in the planarization performed in step 170. In addition, step 170 preferably includes performing a CMP to remove a portion of the perpendicular magnetic pole material 270. Thus, a remaining portion of the PMR pole material 270 forms the PMR pole. FIG. 8G depicts the PMR transducer 250 after step 170 is completed. Thus, substantially only the portion of the nonmagnetic seed layer 268' in the trench 266 remains. In addition, most of the PMR pole material 270 outside of the trench 266 is removed. Consequently, a remaining portion of the PMR pole material forms a PMR pole 270'. Fabrication of the PMR transducer may then be completed.

The method 150 thus allows for formation of a PMR pole. Because the thickness of the insulator 254 is known and the metallic underlayer 252 resides at the bottom of the trench 266, the height of the trench 266 is known. Consequently, the height of the PMR pole 270' is known and variations in the height of the PMR pole 270' may be reduced. In addition, because of the use of the nonmagnetic seed layer 268, only the portion of the PMR pole material 270 remaining after step 170 forms the PMR pole 270'. Stated differently, because it is nonmagnetic, the seed layer 268 is not part of the PMR pole 270'. As a result, the trench 266 may be made wider without affecting the width of the PMR pole 270'. The nonmagnetic seed layer 268 is, therefore, better able to adhere to both the sides and bottom of the trench 266 and form a continuous layer within the trench 266. The PMR pole material 270 is thus better able to adhere to the seed layer and remain in the trench 266. The yield may thereby be improved using the method 150. In addition, it may be noted that despite the possibility of the metal mask 258' being exposed to an RIE performed to form the trench 266 in step 164, any rounding in the corners 257 of the metal mask do not affect the PMR pole 270'. The metal mask 258' and the portion of the PMR pole material 270 at the same height as the metal mask 258' are removed during the planarization performed in step 170. Consequently, the PMR pole 270' does not have rounded corners that may otherwise adversely affect performance of the PMR pole 270'.

Thus, using the methods 100, 120, and 150, fabrication, performance, and reliability of PMR transducers 200 and 250 may be improved.

I claim:

1. A perpendicular magnetic recording transducer comprising:
    a metallic underlayer;
    an insulator having a trench therein, the trench having a top, a bottom, and sides, the bottom of the trench including a portion of the metallic underlayer, the top of the trench being wider than the bottom of the trench;
    a nonmagnetic seed layer, at least a portion of the seed layer residing in the trench and covering the bottom and sides of the trench;
    a perpendicular magnetic recording pole, at least a portion of the perpendicular magnetic recording pole residing in the trench and on the at least the portion of the seed layer.

2. The perpendicular magnetic recording transducer of claim 1 wherein the top of trench has a width of at least 0.14 micron and not more than 0.34 micron.

3. The perpendicular magnetic recording transducer of claim 1 wherein the top of trench has a width of at least 0.2 micron and not more than 0.28 micron.

4. The perpendicular magnetic recording transducer of claim 3 wherein the perpendicular magnetic pole has a top having a width of at least 0.08 micron and not more than 0.17 micron.

5. The perpendicular magnetic recording transducer of claim 1 wherein the nonmagnetic seed layer has a thickness of at least three hundred Angstroms and not more than seven hundred Angstroms.

6. The perpendicular magnetic recording transducer of claim 1 wherein the nonmagnetic seed layer has a thickness of at least four hundred Angstroms and not more than six hundred Angstroms.

7. The perpendicular magnetic recording transducer of claim 1 wherein the nonmagnetic seed layer is a stop layer for a chemical mechanical polish that can remove a portion of the perpendicular magnetic recording pole.

8. The perpendicular magnetic recording transducer of claim 7 wherein a portion of the seed layer resides above a portion of the insulator.

9. The perpendicular magnetic recording transducer of claim 8 further comprising:
    a metal layer having an aperture above the trench, the metal layer residing between the portion of the insulator and the portion of the seed layer.

10. The perpendicular magnetic recording transducer of claim 8 wherein the nonmagnetic seed layer includes at least one of Ru and Ta.

11. The perpendicular magnetic recording transducer of claim 1 wherein the nonmagnetic seed layer is removable by a chemical mechanical polish that can remove a portion of the perpendicular magnetic recording pole.

12. The perpendicular magnetic recording transducer of claim 1 wherein the nonmagnetic seed layer includes at least one of NiNb, NiCr, Cr, Ti and Au.

* * * * *